(12) United States Patent
Yue et al.

(10) Patent No.: US 8,075,122 B2
(45) Date of Patent: Dec. 13, 2011

(54) INKJET INK SET

(75) Inventors: Shunqiong Yue, San Diego, CA (US);
Peter C. Morris, San Diego, CA (US);
Anne M. Kelly-Rowley, San Diego, CA (US);
Zeying Ma, San Diego, CA (US);
David Mahli, San Diego, CA (US);
Howard A. Doumaux, San Diego, CA (US);
Gregg A Lane, San Diego, CA (US);
John M Gardner, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 11/496,534

(22) Filed: Jul. 31, 2006

(65) Prior Publication Data

US 2008/0024575 A1  Jan. 31, 2008

(51) Int. Cl.
*C09D 11/00* (2006.01)

(52) U.S. Cl. .......... 347/100; 347/98; 106/31.6; 523/160

(58) Field of Classification Search .......... 347/95–100; 106/31.13, 31.6, 31.27; 523/160
See application file for complete search history.

(56) References Cited

U.S. PATENT DOCUMENTS

| 6,234,606 | B1* | 5/2001 | Suzuki ..................... 347/43 |
| 6,244,688 | B1 | 6/2001 | Hickman |
| 6,383,275 | B1* | 5/2002 | Lin ........................ 106/31.27 |
| 6,419,340 | B1 | 7/2002 | Wickham et al. |
| 6,478,862 | B1 | 11/2002 | Elwakil |
| 6,533,851 | B2* | 3/2003 | Lee et al. ................ 106/31.27 |
| 6,585,817 | B2 | 7/2003 | Lee et al. |
| 6,592,657 | B2 | 7/2003 | Lee et al. |
| 6,612,240 | B1 | 9/2003 | Silverbrook et al. |
| 6,715,868 | B2 | 4/2004 | Schmidt et al. |
| 6,814,426 | B2 | 11/2004 | Doll et al. |
| 6,834,934 | B2 | 12/2004 | Kushner et al. |
| 6,997,979 | B2 | 2/2006 | Bauer et al. |
| 7,384,465 | B2* | 6/2008 | Jackson ..................... 106/31.6 |
| 2002/0185037 | A1* | 12/2002 | Lee et al. ................ 106/31.58 |
| 2004/0027402 | A1 | 2/2004 | Silverbrook |
| 2004/0030001 | A1 | 2/2004 | Ma et al. |
| 2004/0216638 | A1 | 11/2004 | Rolly |
| 2005/0284330 | A1* | 12/2005 | Jackson ..................... 106/31.6 |
| 2006/0119681 | A1 | 6/2006 | Sugimoto et al. |

FOREIGN PATENT DOCUMENTS

| EP | 1 231 246 A | 8/2002 |
| EP | 1 559 755 A | 8/2005 |
| WO | WO 96/34763 | 11/1996 |

OTHER PUBLICATIONS

U.S. Appl. No. 11/263,668, filed Oct. 31, 2005, Ma et al.
U.S. Appl. No. 11/294,042, filed Dec. 5, 2005, Ma et al.
U.S. Appl. No. 11/471,269, filed Jun. 20, 2006, Yue et al.

* cited by examiner

*Primary Examiner* — Matthew Luu
*Assistant Examiner* — Rut Patel

(57) ABSTRACT

An inkjet ink set includes eleven colored inks and a surface enhancing ink. The eleven colored inks include a magenta ink, a light magenta ink, a yellow ink, a cyan ink, a light cyan ink, a medium gray ink, a light gray ink, a photo black ink, a red ink, a green ink, and a blue ink. The surface enhancing ink is configured to enhance gloss of an image formed with at least one of the eleven colored inks.

20 Claims, 1 Drawing Sheet

INKJET INK SET

BACKGROUND

The present disclosure relates generally to inkjet ink sets.

An inkjet printing system generally includes a printhead and an ink source which supplies liquid ink to the printhead. The printhead ejects ink drops through a plurality of orifices or nozzles and onto a print media, such as paper. Typically, the nozzles are arranged in one or more arrays such that properly sequenced ejection of ink from the nozzles causes characters or other images to be printed upon the print media as the printhead and the print media are moved relative to each other.

Inkjet ink sets used in inkjet printing systems often include four, six or eight different colored inks. Generally, the colors included in such ink sets are one or more shades of cyan, magenta, yellow and/or black. The inks of the set are combined together to form secondary colors. The combination of two or more colored inkjet inks may result in a printed image having substantially non-uniform gloss, due, at least in part, to the roughness of the mixed ink film. The combination of two or more inks may also have a relatively high ink flux. Blotchiness of the filled area (i.e., coalescence) may result at high density areas when the ink flux exceeds the capacity of the media. When the printed image does exhibit such undesirable characteristics, the characteristics often manifest themselves at relatively high ink density areas.

The addition of more colors (e.g., green, red, blue, etc.) to an ink set may be problematic, as these extended colors tend to have multivalent ion contaminants. After repeated use, these contaminants may be deposited onto printhead resistors as a film build-up. This build-up may reduce the thermal efficiency of heat transfer, which reduces the ink drop velocity and drop weight, resulting in less color saturation and banding.

BRIEF DESCRIPTION OF THE DRAWINGS

Features and advantages of embodiment(s) of the present disclosure will become apparent by reference to the following detailed description and drawings.

DETAILED DESCRIPTION

Figure 1:
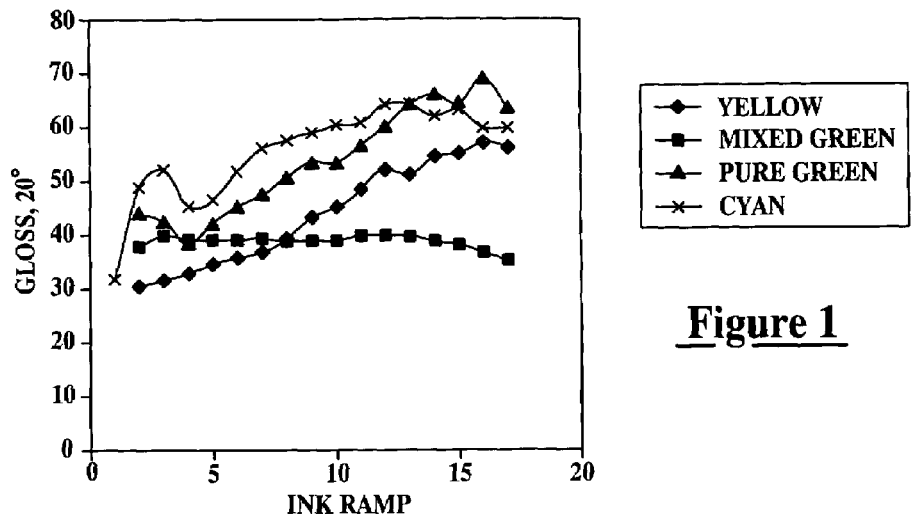
FIG. 1 is a graph depicting gloss level vs. ink ramp for embodiments of yellow ink, cyan ink, a green ink formed from a mixture of the yellow and cyan ink, and a pure green ink.

Embodiments of the ink set disclosed herein advantageously provide an enhanced color gamut for the printing system in which they are used. The inks of the ink set offer a wide range of colors. Furthermore, the inks of the ink set may be combined with or printed adjacent a surface enhancing ink to produce images having substantially uniform gloss uniformity, substantially reduced bronzing effects, substantially reduced bronzing, or various combinations thereof.

"Bronzing", as used herein, refers to the phenomenon that a printed image has a metallic luster appearance rather than its intended color when viewed at an angle. Bronzing often manifests as a magenta sheen over magenta area fills, and a yellowish to reddish to bluish sheen over gray area fills. Generally, bronzing may be most severe at high gloss areas, and decreases at lower gloss areas.

As used herein, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties suitable for effective inkjet printing.

An embodiment of the inkjet ink disclosed herein includes eleven colored inks and a surface enhancing ink. The eleven colored inks include a magenta ink, a light magenta ink, a yellow ink, a cyan ink, a light cyan ink, a medium gray ink, a light gray ink, a photo black ink, a red ink, a green ink, and a blue ink. Generally, the surface enhancing ink is substantially colorless ink and is configured to enhance gloss and/or gloss uniformity of an image formed with at least one of the eleven colored inks. Furthermore, the combination of the two gray inks with the photo black ink achieves substantially smooth transitions in gray scale printing so that the images are substantially free of visible graininess. It is believed that printing photo black ink without two gray inks may require the introduction of dark black dots in light areas (such as the skin tone colors) to increase grain visibility.

Each of the colored inks generally includes an ink vehicle and at least one pigment. The surface enhancing ink generally includes an ink vehicle and a polymer or latex.

"Liquid vehicle" or "ink vehicle," as used herein, refers to the vehicle in which colorant is placed to form a colored ink, or the vehicle in which polymers or latex and no colorant is placed to form the colorless surface enhancing ink. A wide variety of ink vehicles may be used with the inks, systems, and methods according to embodiments disclosed herein. It is to be understood that the inks in the ink set disclosed herein may be aqueous based inks, organic based inks, or combinations thereof. Examples of suitable ink vehicle components include, but are not limited to water soluble polymers, anionic polymers, surfactants (e.g., non-ionic surfactants, ethoxylated nonionic fluorosurfactants, etc.), solvents, co-solvents, buffers, biocides, sequestering agents, viscosity modifiers, surface-active agents, chelating agents (e.g., ethylenediaminetetraacetic acid (EDTA)), resins, and/or water, and/or combinations thereof.

In an embodiment, the ink vehicle includes one or more of the following: chemicals such as amino tri(methylene phosphonic acid), 1-hydroxyethylidene 1,1-diphosphonic acid, hexamethylenediamine tetra(methylene phosphonic acid), diethylenetriamine penta(methylene phosphonic acid), bis(hexamethylenetriamine penta(methylene phosphonic acid)), or derivatives thereof; other phosphates; Tris[hydroxymethyl]aminomethane (TRIS); water soluble polymers; anionic polymers; SURFYNOL 440 (a non-ionic surfactant commercially available from Air Products and Chemicals, Inc. located in Allentown, Pa.); glyceryl polyoxyethyl ether; pyrrolidone; glycerol; diethylene glycol; 1,2-hexanediol; Zonyl® FSO (an ethoxylated nonionic fluorosurfactant commercially available from Dupont located in Wilmington, Del.); biocides (a non-limiting example of which is commercially available under the tradename PROXEL GXL (a solution of 1,2-benzisothiazolin-3-one) from Avecia Inc. located in Wilmington, Del.); triethanolamine; and combinations thereof.

The above-mentioned phosphonic acids, derivatives thereof, or combinations thereof may be used in embodiments of the ink formulations, generally in an amount ranging from about 0 wt. % to about 1 wt. %. As such, some of the inks may include the phosphonic acid(s) while others do not include them. Non-limiting examples of derivatives of the phosphonic acids include one or more functional groups attached to the acid.

In an embodiment, the green and blue inks in the ink set each include 1 wt. % or less of one or more phosphonic acid(s) (e.g., amino tri(methylene phosphonic acid), 1-hydroxyethylidene 1,1-diphosphonic acid, hexamethylenediamine tetra (methylene phosphonic acid), diethylenetriamine penta(methylene phosphonic acid), bis(hexamethylenetriamine penta (methylene phosphonic acid)), or derivatives thereof, or combinations thereof), and the other colored inks (e.g., red, magenta, cyan, etc.) do not include any phosphonic acid(s). Without being bound to any theory, it is believed that the addition of phosphonic acid(s) substantially improves the kogation of the green ink. It is further believed that the phosphonic acid(s) chelates the multivalent ions present in each of the blue and green inks, thereby substantially preventing these inks from baking onto resistor surfaces of the printheads.

Some inks (e.g., red inks) that are known to have multivalent ions may be subjected to processing to remove such ions. As such, the addition of the phosphonic acid(s) to these inks may not be desirable.

As previously stated, each of the colored inks includes the ink vehicle and one or more pigments. The magenta and light magenta inks may include substantially the same pigment(s) at different pigment loads, thereby providing each of the inks with a different hue. Non-limiting examples of the magenta pigments include pigment red 5, pigment red 7, pigment red 12, pigment red 48, pigment red 48, pigment red 57, pigment red 112, pigment red 122, and the like. Such pigment(s) are present in the magenta ink in an amount ranging from about 1.8 wt. % to about 6 wt. %. These same pigment(s) are present in the light magenta ink in an amount ranging from about 0.5 wt. % to about 1.8 wt. %.

Similar to the magenta and light magenta inks, the cyan and light cyan inks may include substantially the same pigment(s) at different pigment loads so that each of the inks exhibits a different hue. Non-limiting examples of the cyan pigments includes pigment blue 1, pigment blue 2, pigment blue 3, pigment blue 15:3, pigment blue 16, pigment blue 22, vat blue 4, vat blue 6, and the like. Such pigment(s) are present in the cyan ink in an amount ranging from about 1.8 wt. % to about 5 wt. %. These same pigment(s) are present in the light cyan ink in an amount ranging from about 0 wt. % to about 1.8 wt. %.

Examples of suitable pigments for the yellow ink include pigment yellow 1, pigment yellow 2, pigment yellow 3, pigment yellow 13, pigment yellow 16, pigment yellow 83, pigment yellow 74, pigment yellow 138, pigment yellow 158, pigment yellow 128, pigment yellow 151, pigment yellow 213, pigment yellow 93, pigment yellow 155, pigment yellow 110, pigment yellow 150, or the like. In an embodiment, the yellow pigment is present in the yellow ink in an amount ranging from about 2 wt. % to about 6 wt. %.

Each of the medium and light gray inks of an embodiment of the ink set include a combinations of pigments. It is to be understood that the pigment loadings suitable for forming the medium gray ink are different than the loadings suitable for forming the light gray ink. As such, the effective amounts of the pigments may be altered to achieve a desirable hue of the gray ink. Examples of suitable pigments for the medium and light gray inks include a black pigment and at least one color pigment (e.g., cyan, violet, magenta, red, orange, yellow, green, or blue pigments, or combinations thereof) dispersed therein. Non-limitative examples of such gray inks are described in U.S. patent application Ser. No. 11/471,269, filed on Jun. 20, 2006, which is incorporated herein by reference in its entirety. Other examples of suitable gray inks are described in U.S. Pat. No. 6,997,979 to Bauer et al., issued on Feb. 14, 2006, and in U.S. patent application Ser. No. 10/428, 298, filed on Apr. 30, 2003 (U.S. Publication No. 2004/ 0216638, published Nov. 4, 2004), each of which is incorporated herein by reference in its entirety.

An embodiment of the ink set also includes a photo black ink. The photo black ink generally has very small pigment particles to achieve a high gloss. Photo black inks typically have a maximum optical density (OD) of more than 2.0 and have relatively good smudge resistance on gloss media. Examples of pigments suitable for photo black inks are water dispersible sulfur pigments such as Solubilized Sulfur Black 1, materials such as carbon black (non-limiting examples of which include FW18, FW2, FW1, FW200 (all manufactured by Degussa Inc. located in Düsseldorf, Germany); Monarch 1100, Monarch 700, Monarch 800, Monarch 1000, Monarch 880, Monarch 1300, Monarch 1400, Regal 400R, Regal 330R, Regal 660R (all manufactured by Cabot Corporation located in Boston, Mass.); Raven 5750, Raven 250, Raven 5000, Raven 3500, Raven 1255, Raven 700 (all manufactured by Columbian Chemicals, Co. located in Marietta, Ga.)) or derivatives of carbon black. The photo black ink may also include a color pigment, such as those previously described for the light and medium gray inks.

The ink set disclosed herein also includes a red ink. Non-limiting examples of suitable pigments for the red ink include PR168, PR254, PR208, PR177, PR147, PR148, or combinations thereof. The pigment loading for the red ink ranges from about 2 wt. % to about 6 wt. %.

The green ink of the ink set may include pigment(s) selected from PG36, PG9, PB76, and combinations thereof. The pigment loading in the green ink generally ranges from about 2 wt. % to about 6 wt. %. As previously described, the green ink also includes at least some phosphonic acid(s) (e.g., amino tri(methylene phosphonic acid), 1-hydroxyethylidene 1,1-diphosphonic acid, hexamethylenediamine tetra(methylene phosphonic acid), diethylenetriamine penta(methylene phosphonic acid), bis(hexamethylenetriamine penta(methylene phosphonic acid)), or derivatives thereof, or combinations thereof) in the ink vehicle.

Embodiments of the ink set also include a blue ink. Examples of pigment(s) suitable for forming blue ink include, but are not limited to PV19, PV23, PV37, PV42, PV3, PV32, PV36, PV38, PB15:6, PB60, PB1, PB2, PB3, PB16, PB22, PB 15:3, PB80, PB76, or combinations thereof. The effective amount of pigment in the blue ink has a pigment load ranging from about 0.5 wt. % to about 6 wt. %.

In an embodiment, the surface enhancing ink includes a soluble polymer or dispersed latex (collectively referred to herein as "polymer") as well as an ink vehicle. Non-limiting examples of soluble polymers include acrylics and styrene-acrylics. Without being bound to any theory, it is believed that the polymer in the surface enhancing ink acts similarly to pigments, and clogs the pores of the porous or semi-porous media to increase the gloss and its uniformity over substantially the entire surface of the media. Non-limiting examples of such surface enhancing inks are described in U.S. patent application Ser. No. 10/208,994, filed on Jul. 30, 2002 (U.S. Publication No. 2004-0030001, published Feb. 12, 2004), incorporated herein by reference in its entirety.

Porous media, which tends to have relatively low gloss, is often used for printing pigmented inks. Pigmented inks tend to have relatively high gloss. As such, an increase in the amount of ink printed on the porous media tends to increase the gloss of the printed image(s). In some instances, the printed image may be undesirably glossy. The surface enhancing ink of the ink set disclosed herein may be combined with printed colored inks having this undesirably high glossiness in order to increase the haziness of the printed ink and substantially minimize bronzing (see Example 4 and FIG. 3). In another embodiment, the surface enhancing ink may also be printed in low ink density areas to fill in the spaces in the media where there is an absence of color, thereby promoting a substantially uniform surface to achieve high gloss (see Example 3 and FIG. 2).

Embodiments of the ink set may be provided in a variety of pen configurations such as single color pens, dual chamber pens, tri-chamber pens, brick heads, or other pen configurations, without limitation. Non-limiting examples of such configurations are described in U.S. patent application Ser. No. 11/263,668, filed on Oct. 31, 2005, incorporated herein by reference in its entirety.

An embodiment of the method for forming an image on a substrate using the ink set(s) disclosed herein includes establishing at least one colored ink on at least a portion of the substrate; and establishing the surface enhancing ink on: 1) the same portion of the substrate as the colored ink; and/or 2) on another portion of the substrate where there is an absence of the colored ink.

Examples of suitable substrate materials include, but are not limited to plain papers, microporous photopapers, coated papers, glossy photopapers, semi-gloss photopapers, heavy weight matte papers, billboard papers, digital fine art papers, calendared papers, vinyl papers, or combinations thereof.

The image may include alphanumeric indicia, graphical indicia, or combinations thereof. Furthermore, the colored ink(s) and the surface enhancing ink may be established simultaneously or sequentially via inkjet printing techniques. Non-limiting examples of suitable inkjet printing techniques include piezoelectric inkjet printing, thermal inkjet printing, or combinations thereof.

The amount of each of the colored inks and surface enhancing ink established via inkjet printing depends, at least in part, on the desirable color and gloss for the printed image. As such, an embodiment of the method includes changing the effective amount(s) that are to be established on the substrate, of the colored ink(s), the surface enhancing ink, or combinations thereof in order to obtain a desired color and gloss of the printed image. Generally, images printed with embodiments of the ink set disclosed herein exhibit substantial gloss uniformity, reduced bronzing, reduced coalescence, and/or combinations thereof.

To further illustrate embodiment(s) of the present disclosure, various examples are given herein. It is to be understood that these examples are provided for illustrative purposes and are not to be construed as limiting the scope of the disclosed embodiment(s).

Example 1

The gloss level of yellow ink, cyan ink, green ink formed from a mixture of the yellow and cyan inks, and an embodiment of the green ink disclosed herein were measured. The gloss level of the printed image was measured from color squares with increasing amount of ink printed. As shown in FIG. 1, the gloss of the cyan and yellow inks tends to be relatively high. However, the green ink formed from a combination of these two inks has a lower gloss level than either of its components. The pure green ink disclosed herein has a substantially level gloss, and reduces the amount of ink mixing needed in a system without a pure green ink.

Example 2

Four pure green inks were prepared, two with the addition of Dequest® 2054, a hexamethylenediamine tetra(methylene phosphonic acid) commercially available from Solutia Inc., located in St. Louis, Mo. The inks labeled "A1" and "A2" in Table 1 were formulated with a grade of pigment green 36 having a lower level of multivalent ions, and the inks labeled "B1" and "B2" in Table 1 were formulated with a different grade of pigment green 36 having a higher level of multivalent ions. The velocity of each of the inks was calculated prior to firing any drops (i.e., initial velocity). The initial velocity for each of the inks ranged from about 8 m/s to about 20 m/s. Each of the inks was printed onto photo paper via a Hewlett Packard Photosmart Pro 9180B printer. The velocity of each of the inks was measured again (i.e., final velocity) after 200M drops were fired, respectively. A percentage of the retained velocity was measured by dividing the final velocity by the initial velocity. These results are shown in Table 1 below. As depicted, the green inks including the hexamethylenediamine tetra(methylene phosphonic acid) had higher % retained velocity than those green inks without the hexamethylenediamine tetra(methylene phosphonic acid).

TABLE 1

| | % retained velocity after 200 M drops fired | |
| --- | --- | --- |
| Ink | Dequest ® 2054 | % retained velocity after 200 M drops |
| A1 | None | 57% |
| A2 | 1% | 92% |
| B1 | None | 37% |
| B2 | 1% | 85% |

Example 3

Figure 2:
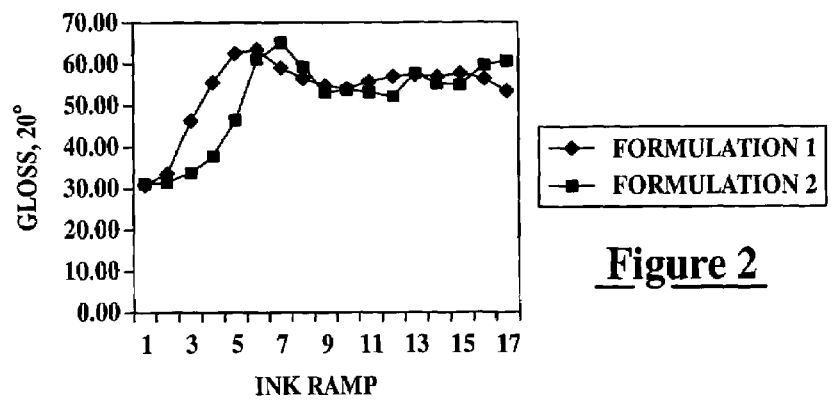
FIG. 2 is a graph depicting gloss level vs. ink ramp for embodiments of surface enhancing inks printed on porous media.

Two embodiments of the surface enhancing ink disclosed herein were printed on porous media. The first surface enhancing ink ("Formulation 1") included an acrylate polymer and the second surface enhancing ink ("Formulation 2") included a polyurethane. FIG. 2 depicts the gloss of the printed surface enhancing inks. As shown in FIG. 2, when a sufficient amount (i.e., about 50% of the color square area) of the respective surface enhancing ink is printed alone on porous media, the printed area has high gloss. This may be due, at least in part, to a film formation on the porous media. The gloss data shown in FIG. 2 indicates that a relatively large amount (i.e., greater than or equal to about 40% of the color square area) of an embodiment of the surface enhancing ink printed on low density ink area(s) of porous media should advantageously increase the gloss at those area(s).

Example 4

Figure 3:
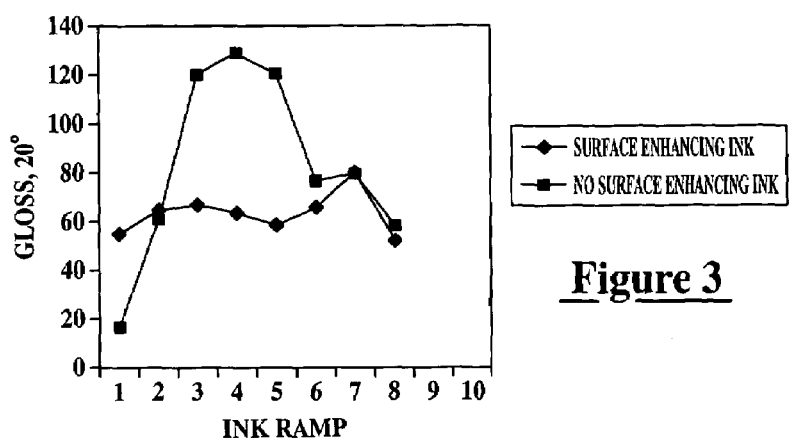
FIG. 3 is a graph depicting gloss level vs. ink ramp for an embodiment of a high gloss ink, and for an embodiment of the high gloss ink printed with a surface enhancing ink.

A light gray ink was printed on photo media, both with the addition of the surface enhancing ink and without the surface enhancing ink. As depicted in FIG. 3, the gray ink exhibits a high gloss (e.g., about 130) when printed alone. The high gloss may result in bronzing of the printed image. The addition of the surface enhancing ink reduces the gloss level of the gray ink, thereby reducing bronzing.

While several embodiments have been described in detail, it will be apparent to those skilled in the art that the disclosed embodiments may be modified. Therefore, the foregoing description is to be considered exemplary rather than limiting.

What is claimed is:

1. An inkjet ink set, comprising:
    eleven colored inks including a magenta ink, a light magenta ink, a yellow ink, a cyan ink, a light cyan ink, a medium gray ink, a light gray ink, a photo black ink, a red ink, a green ink including a PG 36 pigment, and a blue ink including a PV 23 pigment, each of the green and the blue ink including hexamethylenediamine tetra (methylene phosphonic acid); and
    a surface enhancing ink configured to enhance gloss of an image formed with at least one of the eleven colored inks.

2. The inkjet ink set as defined in claim 1 wherein each of the eleven colored inks includes:
    an ink vehicle; and
    at least one pigment.

3. The inkjet ink set as defined in claim 2 wherein the ink vehicle includes components selected from water soluble polymers; non-ionic surfactants; glyceryl polyoxyethyl ether; 2-pyrrolidone; glycerol; diethylene glycol; 1,2-hexanediol; ethoxylated nonionic fluorosurfactants; biocides; triethanolamine; Tris[hydroxymethyl]aminomethane; and combinations thereof.

4. The inkjet ink set as defined in claim 1 wherein the green ink further includes:
    a component selected from water soluble polymers, non-ionic surfactants, glyceryl polyoxyethyl ether, 2-pyrrolidone, glycerol, diethylene glycol, 1,2-hexanediol, ethoxylated nonionic fluorosurfactants, biocides, triethanolamine, Tris[hydroxymethyl]aminomethane, and combinations thereof; and
    an other pigment selected from PG9, PB76, and combinations thereof.

5. The inkjet ink set as defined in claim 4 wherein the pigment in the green ink is present in an amount ranging from about 2 wt. % to about 6 wt. %.

6. The inkjet ink set as defined in claim 1 wherein the blue ink further includes:
    a component selected from non-ionic surfactants, glyceryl polyoxyethyl ether, 2-pyrrolidone, diethylene glycol, 1,2-hexanediol, ethoxylated nonionic fluorosurfactants, biocides, triethanolamine, and combinations thereof; and
    an other pigment selected from PV19, PV37, PV42, PV3, PV32, PV36, PV38, PB15:6, PB60, PB1, PB2, PB3, PB16, PB22, PB 15:3, PB80, PB76, and combinations thereof.

7. The inkjet ink set as defined in claim 6 the pigment in the blue ink is present is an amount ranging from about 0.5 wt. % to about 6 wt. %.

8. The inkjet ink set as defined in claim 1 wherein at least one of the magenta ink, the light magenta ink, the yellow ink, the cyan ink, the light cyan ink, the medium gray ink, the light gray ink, the photo black ink, or the red ink includes up to about 1 wt. % of the hexamethylenediamine tetra(methylene phosphonic acid).

9. The inkjet ink set as defined in claim 1 wherein only the green ink and the blue ink include the hexamethylenediamine tetra(methylene phosphonic acid).

10. The inkjet ink set as defined in claim 1 wherein the surface enhancing ink is substantially free of colorants, and includes an ink vehicle and either a water soluble polymer or dispersed latex.

11. The inkjet ink set as defined in claim 1 wherein at least one of the magenta ink, the light magenta ink, the yellow ink, the cyan ink, the light cyan ink, the medium gray ink, the light gray ink, the photo black ink, and the red ink includes a component selected from hexamethylenediamine tetra(methylene phosphonic acid), amino tri(methylene phosphonic acid), 1-hydroxyethylidene 1,1-diphosphonic acid, diethylenetriamine penta(methylene phosphonic acid), bis(hexamethylenetriamine penta(methylene phosphonic acid)), and combinations thereof.

12. An inkjet ink set, comprising: a magenta ink; a light magenta ink; a yellow ink; a cyan ink; a light cyan ink; a medium gray ink; a light gray ink; a photo black ink; a red ink;
    a green ink, including:
        an ink vehicle including:
        a hexamethylenediamine tetra(methylene phosphonic acid) first component; and
        a second component selected from at least one of water soluble polymers, non-ionic surfactants, glyceryl polyoxyethyl ether, 2-pyrrolidone, glycerol, diethylene glycol, 1,2-hexanediol, ethoxylated nonionic fluorosurfactants, biocides, triethanolamine, Tris[hydroxymethyl]aminomethane, and combinations thereof; and
        a PG 36 pigment;
    a blue ink, including:
        an ink vehicle including:
        a hexamethylenediamine tetra(methylene phosphonic acid) first component; and
        a second component selected from non-ionic surfactants, glyceryl polyoxyethyl ether, 2-pyrrolidone, diethylene glycol, 1,2-hexanediol, ethoxylated nonionic fluorosurfactants, biocides, triethanolamine, and combinations thereof; and
        a PV23 pigment; and
    a surface enhancing ink substantially free of colorants, and including: an ink vehicle; and a water soluble polymer or dispersed latex.

13. The inkjet ink set as defined in claim 12 wherein at least one of the magenta ink, the light magenta ink, the yellow ink, the cyan ink, the light cyan ink, the medium gray ink, the light gray ink, the photo black ink, or the red ink includes up to about 1 wt. % of a chemical selected from hexamethylenediamine tetra(methylene phosphonic acid), amino tri(methylene phosphonic acid), 1-hydroxyethylidene 1,1-diphosphonic acid, diethylenetriamine penta(methylene phosphonic acid), bis(hexamethylenetriamine penta(methylene phosphonic acid)), and combinations thereof.

14. A method for forming an image on a substrate, the method comprising:
    establishing at least one colored ink on at least a portion of a substrate; and
    establishing a surface enhancing ink on: 1) the at least a portion of the substrate; or 2) the at least a portion of the substrate and at least an other portion of the substrate where there is an absence of the at least one ink;
    wherein the at least one ink and the surface enhancing ink are part of an ink set including a magenta ink, a light magenta ink, a yellow ink, a cyan ink, a light cyan ink, a medium gray ink, a light gray ink, a photo black ink, a red ink, a green ink including a PG36 pigment, and a blue ink including a PV23 pigment; and the surface enhancing ink;

and wherein each of the blue ink and the green ink includes hexamethylenediamine tetra(methylene phosphonic acid).

15. The method as defined in claim 14 wherein the image exhibits at least one of substantial gloss uniformity, reduced bronzing, or reduced coalescence.

16. The method as defined in claim 14 wherein establishing is accomplished via printing each of the ink and the surface enhancing ink using one of thermal inkjet printing, piezoelectric inkjet printing, or combinations thereof.

17. The method as defined in claim 14 wherein the substrate is selected from plain papers, microporous photopapers, coated papers, glossy photopapers, semi-gloss photopapers, heavy weight matte papers, billboard papers, digital fine art papers, calendared papers, vinyl papers, and combinations thereof.

18. The method as defined in claim 14 wherein the at least one ink and the surface enhancing ink are established substantially simultaneously or sequentially.

19. The method as defined in claim 14 wherein the green ink includes:
   the hexamethylenediamine tetra(methylene phosphonic acid);
   a component selected from water soluble polymers, non-ionic surfactants, glyceryl polyoxyethyl ether, 2-pyrrolidone, glycerol, diethylene glycol, 1,2-hexanediol, ethoxylated nonionic fluorosurfactants, biocides, triethanolamine, Tris[hydroxymethyl]aminomethane, and combinations thereof; and
   an other pigment selected from PG9, PB76, and combinations thereof.

20. The method as defined in claim 14 wherein the blue ink includes:
   the hexamethylenediamine tetra(methylene phosphonic acid);
   a component selected from non-ionic surfactants, glyceryl polyoxyethyl ether, 2-pyrrolidone, diethylene glycol, 1,2-hexanediol, ethoxylated nonionic fluorosurfactants, biocides, triethanolamine, and combinations thereof; and
   an other pigment selected from PV19, PV37, PV42, PV3, PV32, PV36, PV38, PB15:6, PB60, PB1, PB2, PB3, PB16, PB22, PB 15:3, PB80, PB76, and combinations thereof.

* * * * *